Dec. 14, 1926.  
F. O. FARWELL  
MECHANICAL MOVEMENT  
Filed Sept. 29, 1924
1,610,273
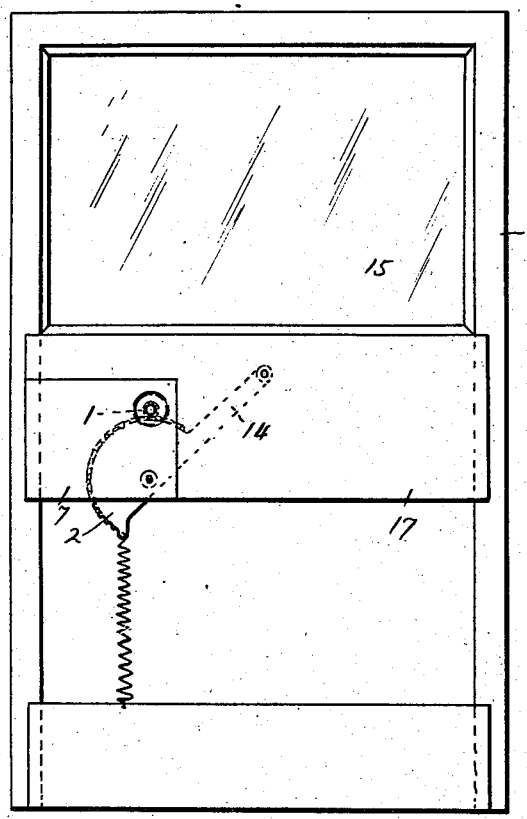
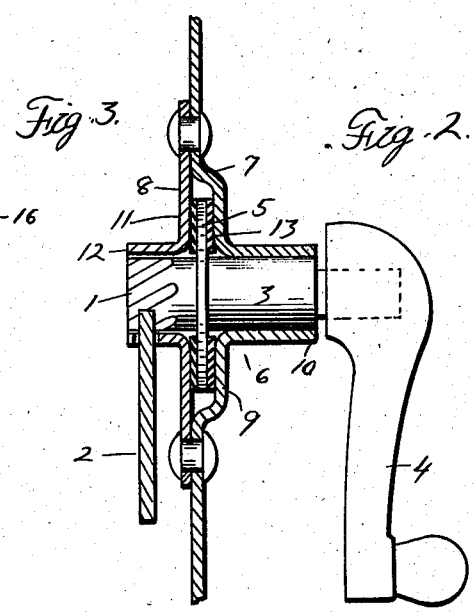
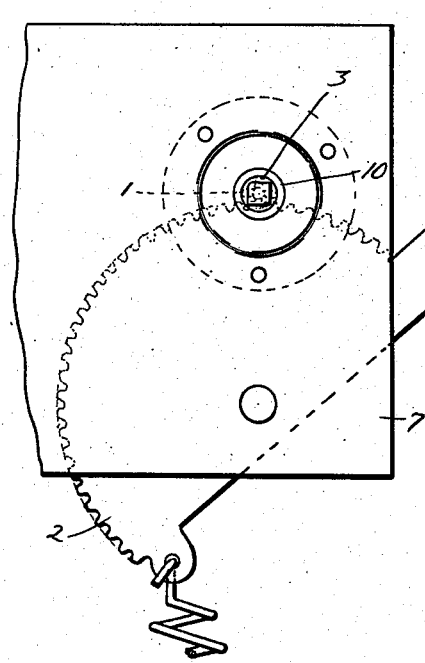
Inventor  
Fay O. Farwell  
Attorneys Patented Dec. 14, 1926.

1,610,273

UNITED STATES PATENT OFFICE.

FAY O. FARWELL, OF TOLEDO, OHIO, ASSIGNOR TO THE DURA COMPANY, OF TOLEDO, OHIO, A CORPORATION OF DELAWARE.

MECHANICAL MOVEMENT.

Application filed September 29, 1924. Serial No. 740,573.

The invention relates to mechanical movements, and has for one of its objects the provision of an improved mechanical movement including meshing driving and driven toothed members so arranged as to effect rotation of both toothed members in either direction when driving power is applied to the driving toothed member and to produce an effective locking of both toothed members against rotation in either direction when the driving power is released. Another object is the provision of locking means controlled by the reactive effort of the teeth of the toothed members. A further object is to provide a window regulator embodying this mechanical movement for actuating the window and locking the same in its various positions.

With these as well as other objects in view the invention resides in the novel features of construction and combinations and arrangements of parts as more fully hereinafter set forth.

In the drawings:

Figure 1 is an inner side elevation of a mechanical movement embodying my invention;

Figure 2 is a cross section therethrough;

Figure 3 is an interior side elevation of a vehicle door having applied thereto a window regulator embodying my mechanical movement.

1 and 2 are meshing driving and driven toothed members respectively. 3 is the driving shaft having secured at its outer end the driving toothed member 1. As shown this driving toothed member is a pinion formed integral with the shaft. 4 is a handle secured to the inner end of the driving shaft for rotating the same.

For the purpose of locking the toothed members from rotation in either direction when the driving power is released and force is applied to the driven toothed member 2 to rotate the same, both the driving and driven members 1 and 2 are provided with meshing helical teeth and the driving toothed member with its shaft 3 is permitted to move axially in opposite directions dependent upon the reactive effort between the teeth of the driving and driven toothed members. The brake disc 5 is also provided upon and movable with the driving shaft 3. Also a stationary brake member 6 is provided for cooperating with the brake disc 5. This stationary brake member comprises the mounting plate 7 and the plate 8 fixedly secured thereto, the mounting plate having the inwardly offset wall 9 at the inner side of the brake disc 5 and the cylindrical flange 10, in which the driving shaft 3 is journaled, and the plate 8 having the wall 11 at the outer side of the brake disc and the cylindrical flange 12 surrounding the driving pinion 1 and preferably slightly spaced thereform. Suitable friction washers 13 are located between the opposite sides of the brake disc 5 and the adjacent walls of the cooperating brake member 6, the arrangement being such that limited axial movement of the driving shaft and corresponding movement of the brake disc is permitted while at the same time sufficient resistance to rotation of the brake disc is opposed to effect the axial movement of the driving shaft and driving pinion through the reactive effort of the teeth of the driving pinion and driven toothed member.

From the above description it will be seen that the driving shaft 3 and the driving pinion 1 may be rotated in either direction through the handle 4 to rotate the driven toothed member 2 in either direction. During this driving operation resistance will be offered to the rotation of the brake disc 5 by the stationary brake member 6 and an interposed friction washer 13, but the leverage is such that this resistance is hardly noticeable. When the driving power has been released and force is applied to the driven toothed member 2 to rotate the same in either direction the reactive effort of the teeth of the driving and driven toothed members forces the driving shaft 3 axially, since it is held from rotation by the cooperating brake members 5 and 6 and an interposed friction washer. The axial movement of the driving shaft in either direction brings the driving disc 5 into firm frictional engagement with a friction washer and as a consequence the driving shaft and the toothed members are locked from rotation.

As shown particularly in Figure 3, this mechanical movement is embodied in a window regulator for raising and lowering a window. In detail 14 is a pivotal lifter arm connected at its free end to the window 15 which is vertically slidable in the uprights 16 of a frame such as a door, this door having in its upper portion an opening adapted to be closed by the window and in its lower portion a chamber for receiving the window when lowered. The mounting plate 7 of the brake member 6 is suitably secured to the lock board 17 of the door and the pivot for the lifter arm is preferably upon this mounting plate. The driven toothed member 2 is a quadrant upon the lifter arm and preferably integral therewith, the teeth of this quadrant being concentric with the lifter arm pivot. With this arrangement it will be seen that the window may be raised or lowered through the lifter arm and the mechanical movement connected thereto. Also that when the driving force upon the driving shaft is released the window will be automatically locked in its adjusted position regardless of any force applied thereto to either raise or lower the same.

What I claim as my invention is:

1. The combination with meshing driving and driven toothed members, of means operative through the reactive effort of the teeth of said members to lock the same against rotation in either direction when the driving power is released.

2. The combination with meshing driving and driven toothed members, and means dependent upon the reactive effort of the teeth of said members and movable into locking position when the driving power is released and force is exerted to rotate the other of said members in either direction.

3. The combination with meshing driving and driven toothed members, of means for locking said members against rotation in either direction, said locking means being controlled by the reactive effort of the teeth of said members.

4. The combination with meshing driving and driven toothed members, and means operative through the reactive effort of the teeth of said toothed members to lock the same against rotation in either direction when the driving power is released and force is applied to said driven toothed member to rotate the same in either direction, said locking means including a brake member secured to one of said toothed members and a cooperating fixed brake member.

5. The combination with meshing driving and driven toothed members, and means operative through the reactive effort of the teeth of said toothed members to lock the same against rotation in either direction when the driving power is released and force is applied to rotate said driven toothed member in either direction, said locking means including a fixed brake member and a second brake member movable with one of said toothed members to alternatively engage portions of said first brake member on opposite sides of said second brake member.

6. The combination with meshing driving and driven toothed members, said driving toothed member being movable relative to said driven toothed member, of a brake member secured to and movable with said driving toothed member, and a cooperating stationary brake member, said first-mentioned brake member being movable to locking engagement with said stationary brake member through the reactive effort of the teeth of said toothed members when the driving power is released and force is applied to rotate said driven toothed member in either direction.

7. The combination with meshing helical driving and driven toothed members, of axially movable means for locking said toothed members against rotation when the driving power is released and force is applied to said driven toothed member to rotate the same in either direction, said locking means being controlled by the reactive effort of the teeth of said toothed members.

8. The combination with meshing helical driving and driven toothed members, said driving toothed member being axially movable, of a brake member secured to and movable with said driving toothed member, and a cooperating stationary brake member, said first-mentioned brake member being movable through the reactive effort of the teeth of said toothed members into engagement with said stationary brake member when the driving power is released and force is applied to said driven toothed member to rotate the same in either direction.

9. The combination with an axially movable driving shaft and a helical toothed member thereon, of a helical toothed member meshing with said first-mentioned member, a brake member upon said shaft and movable therewith, and a stationary brake member surrounding said shaft and cooperating with said first-mentioned brake member to lock said toothed members from rotation in either direction when the driving power is released and force is applied upon said second-mentioned toothed member to rotate the same in either direction.

10. The combination with meshing driving and driven toothed members, of a shaft to which one of said toothed members is secured, said shaft being movable through the reactive effort of the teeth of said toothed members, a brake member upon and movable with said shaft and a fixed brake member cooperating with said first-mentioned brake member and having portions at opposite sides of said first-mentioned brake member alternatively engageable thereby when the driving power is released and effort is applied to rotate said driving toothed member in either direction.

11. The combination with meshing driving and driven toothed members, and a shaft to which one of said toothed members is secured, said shaft being movable through the reactive effort of the teeth of said toothed members, a brake member secured to and movable with said shaft and a cooperating fixed brake member having portions alternatively engageable by said first-mentioned brake members and a portion forming a bearing for said shaft.

12. The combination with meshing driving and driven toothed members having parallel axes of rotation, of means for locking said toothed members against rotation in either direction when the driving power is released, said means being controlled by the relative movement of said toothed members caused by the reactive effort of the teeth thereof.

13. The combination with a lifter arm, of means for actuating and locking the same in its various positions of adjustment, said means including cooperating driving and driven toothed members, and means operative through the reactive effort of the teeth of said toothed members to lock the same against rotation in either direction when the driving power is released.

14. The combination with a lifter arm connected to a window for raising and lowering the same, and a helical toothed member upon said lifter arm of a cooperating helical toothed member meshing with said first-mentioned helical toothed member and adapted to move axially, means for driving said second-mentioned toothed member, a brake disc secured to and movable with said second-mentioned toothed member, and a stationary brake member having portions on opposite sides of said brake disc and alternatively engageable with the same.

15. The combination with a pivotal lifter arm connected to a window for raising and lowering the same, and a quadrant upon said lifter arm having helical teeth, of an axially movable shaft, a helical pinion upon said shaft meshing with said quadrant, a brake disc upon said shaft and movable therewith, a stationary cooperating brake member having portions at opposite sides of said brake disc, and friction members between said brake disc and the portions of said brake member at opposite sides of said brake disc.

16. The combination of a toothed member connected to a window, an axially movable shaft, a helical pinion upon said shaft meshing with said toothed member, a brake disc upon said shaft and movable therewith, a stationary cooperating brake member having portions at opposite sides of said brake disc and friction members between said brake disc and the portions of said brake member at opposite sides of said brake disc.

17. The combination of a driven toothed member connected to a window, a driving toothed member meshing with said driven toothed member and means operative through the reactive effort of the teeth of said members to lock the same against rotation in either direction when the driving power is released.

18. The combination of a driven toothed member connected to a window, a driving member meshing with said driven toothed member and axially movable means operative through the reactive effort of the teeth of said members to lock the same against rotation in either direction when the driving power is released.

19. The combination of a pivotal lifter arm connected to a window, a driven toothed member connected to said arm, a driving toothed member meshing with said driven toothed member and means operative through the reactive effort of the teeth of said members to lock the same against rotation in either direction when the driving power is released.

20. The combination of a pivotal lifter arm connected to a window, a driven toothed member connected to said arm, a driving toothed member meshing with said driven toothed member and axially movable means operative through the reactive effort of the teeth of said members to lock the same against rotation in either direction when the driving power is released.

In testimony whereof I affix my signature.

FAY O. FARWELL.